United States Patent
Kohli

(10) Patent No.: US 10,558,975 B2
(45) Date of Patent: Feb. 11, 2020

(54) SYSTEMS AND METHODS FOR USE IN FACILITATING TRANSACTIONS

(71) Applicant: MASTERCARD INTERNATIONAL INCORPORATED, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 774 days.

(21) Appl. No.: 15/239,385

(22) Filed: Aug. 17, 2016

(65) Prior Publication Data

US 2018/0053185 A1 Feb. 22, 2018

(51) Int. Cl.
*G06Q 20/40* (2012.01)

(52) U.S. Cl.
CPC ... *G06Q 20/4012* (2013.01); *G06Q 20/40145* (2013.01); *G06F 2221/2133* (2013.01)

(58) Field of Classification Search
CPC .......... G06Q 20/4012; G06Q 20/40145; G06F 2221/2133
USPC .......................................................... 705/72
See application file for complete search history.

(56) References Cited

U.S. PATENT DOCUMENTS

| | | | |
|---|---|---|---|
| 6,070,141 A | 5/2000 | Houvener et al. | |
| 7,937,467 B2 | 5/2011 | Barber | |
| 8,255,268 B2 | 8/2012 | Rane et al. | |
| 8,738,418 B2 | 5/2014 | Winters | |
| 8,972,298 B2 | 3/2015 | Kunz et al. | |
| 9,092,773 B2 | 7/2015 | Daly et al. | |
| 2008/0195551 A1 | 8/2008 | McIsaac et al. | |
| 2009/0132347 A1 | 5/2009 | Anderson et al. | |
| 2011/0178846 A1 | 7/2011 | Rane et al. | |
| 2012/0095852 A1 | 4/2012 | Bauer et al. | |
| 2012/0101881 A1 | 4/2012 | Taylor et al. | |
| 2012/0157062 A1 | 6/2012 | Kim et al. | |
| 2014/0012704 A1 | 1/2014 | Mizhen et al. | |
| 2014/0019352 A1 | 1/2014 | Shrivastava | |
| 2014/0052640 A1 | 2/2014 | Pitroda et al. | |
| 2014/0250010 A1 | 9/2014 | Howe | |
| 2015/0073954 A1 | 3/2015 | Braff | |
| 2015/0120560 A1* | 4/2015 | Fisher | G06Q 20/4014 705/44 |

(Continued)

*Primary Examiner* — James D Nigh
(74) *Attorney, Agent, or Firm* — Harness, Dickey & Pierce, P.L.C.

(57) ABSTRACT

Systems and methods are provided for use in facilitating transactions associated with a payment account. One exemplary method includes receiving an authentication request message for a transaction to a payment account associated with a consumer, where the payment account is associated with at least one authentication procedure requiring input from the consumer to authenticate the consumer in connection with the transaction and where the authentication request message includes at least one detail related to the transaction. The method also includes accessing, by a computing device, a profile associated with the consumer and based at least in part on a prior transaction history of the payment account, and opting, by the computing device, the transaction out of the at least one authentication procedure when the at least one detail related to the transaction is consistent with the profile.

18 Claims, 3 Drawing Sheets

(56) References Cited

U.S. PATENT DOCUMENTS

2015/0161608 A1* 6/2015 Gilbert .............. G06Q 20/4014
                                                         705/44
2015/0170148 A1    6/2015 Priebatsch
2015/0363810 A1   12/2015 Kim et al.

* cited by examiner

SYSTEMS AND METHODS FOR USE IN FACILITATING TRANSACTIONS

FIELD

The present disclosure generally relates to systems and methods for use in facilitating transactions between consumers and merchants, and in particular, to systems and methods for use in opting transactions out of one or more authentication methods or procedures when the transactions are consistent with profiles associated with payment accounts to which the transactions are directed (and associated consumers).

BACKGROUND

This section provides background information related to the present disclosure which is not necessarily prior art.

Payment accounts are used by consumers to perform numerous different transactions including, for example, purchasing products from merchants, etc. When the payment accounts are provided to fund the transactions, authentication of the consumers is often involved to provide confidence that the individuals causing the transactions are actually permitted to do so. For example, merchants often solicit or require consumers to provide signatures or personal identification numbers (PINs), in connection with the transactions, to help authenticate the consumers. Other methods for authentication are also known, including, for example, authentication using biometrics, passwords, challenge questions, etc.

DRAWINGS

The drawings described herein are for illustrative purposes only of selected embodiments and not all possible implementations, and are not intended to limit the scope of the present disclosure.

Figure 1:
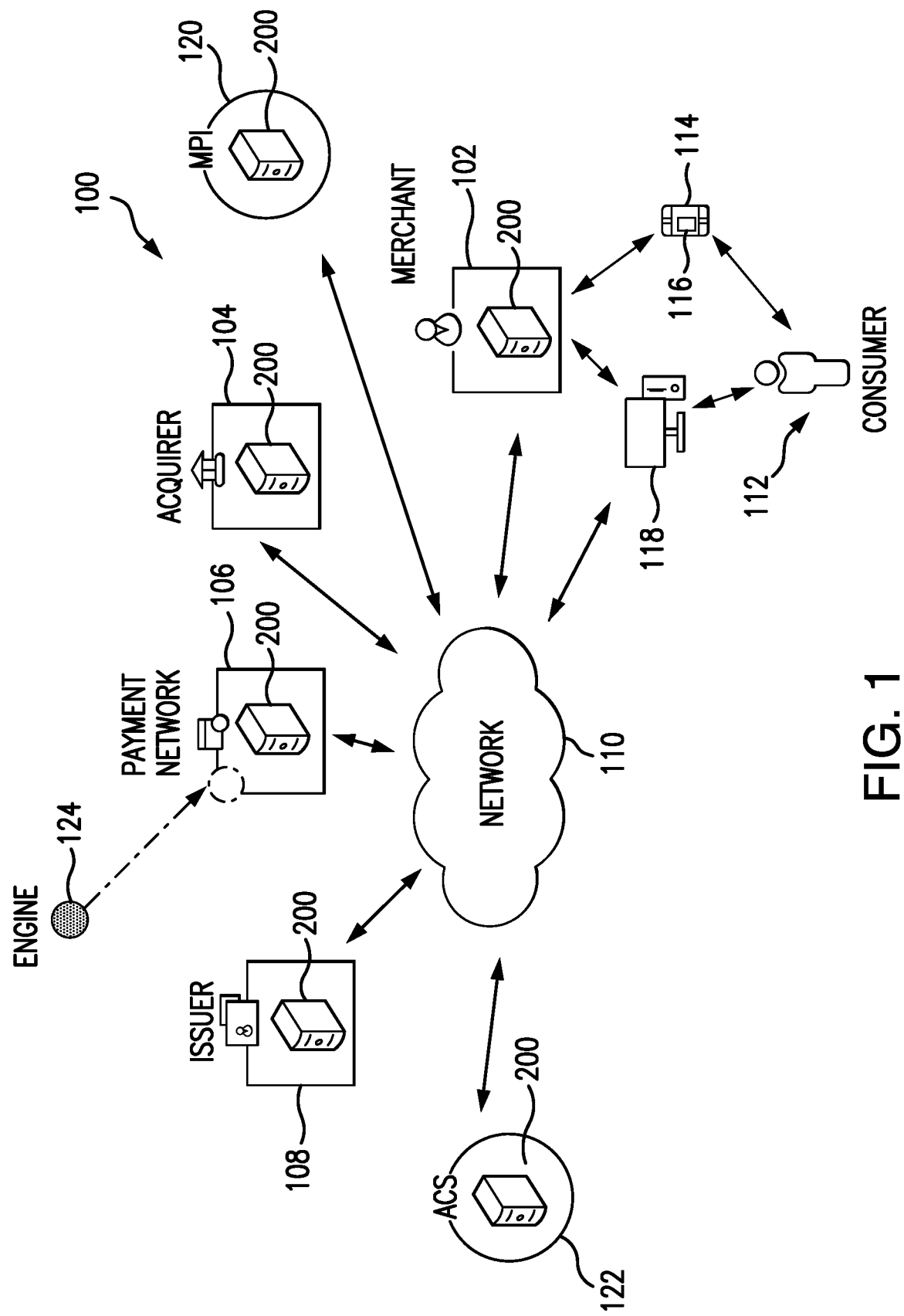
Figure 2:
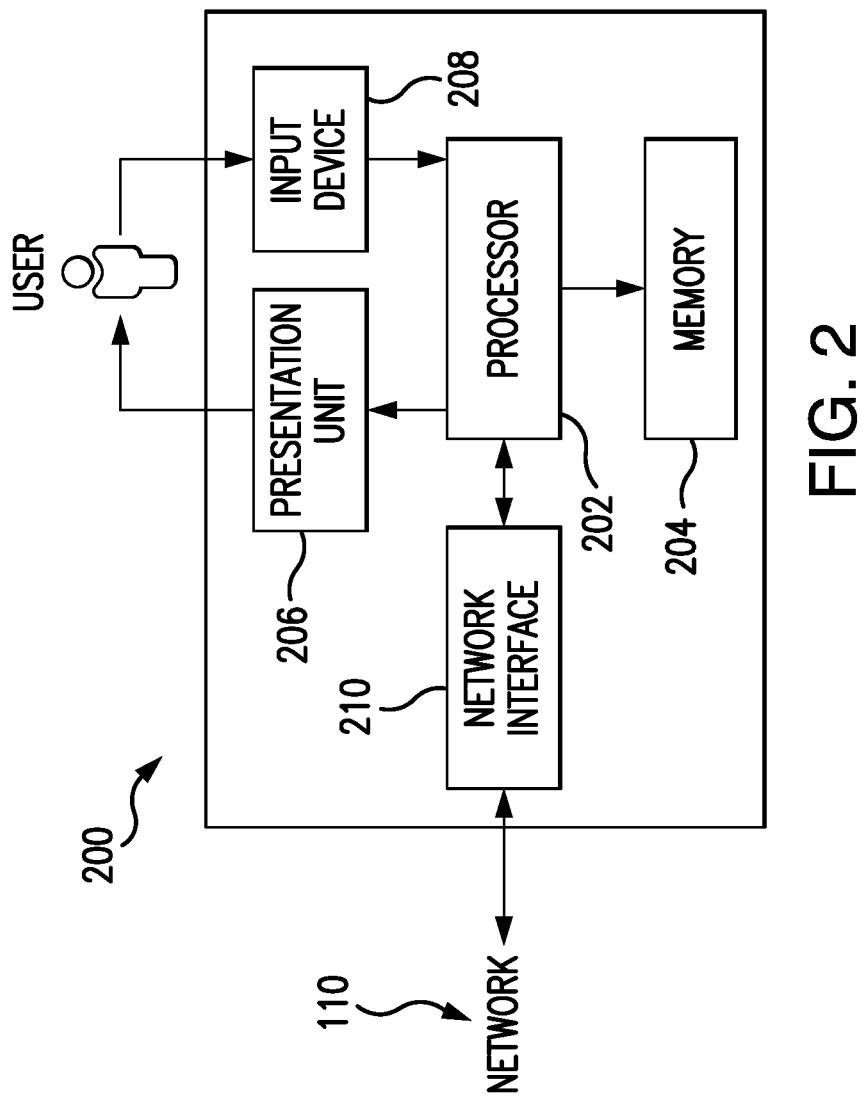
Figure 3:
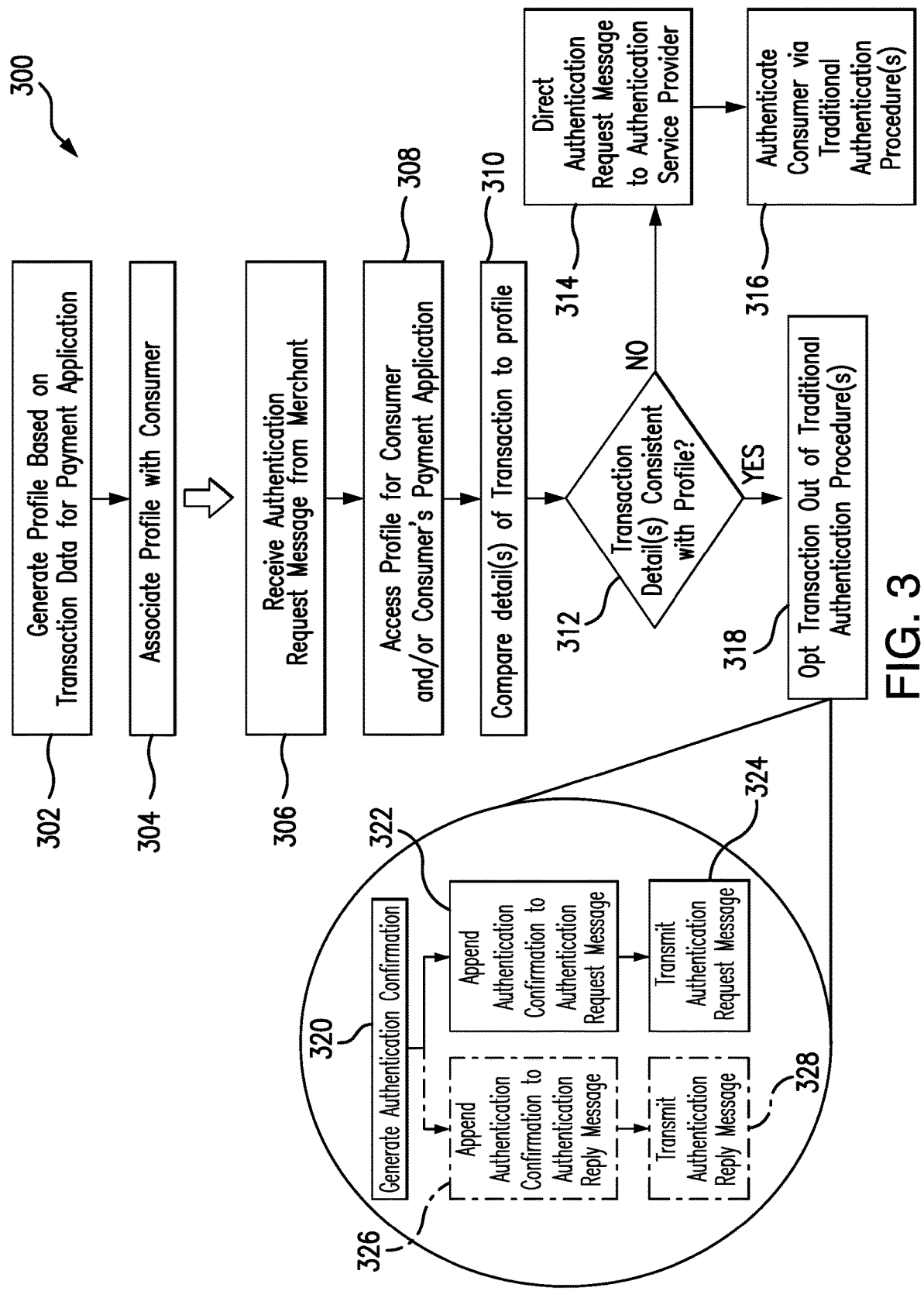

FIG. 1 is a block diagram of an exemplary system of the present disclosure suitable for use in facilitating transactions to payment accounts and opting certain ones of the transactions out of one or more authentication methods or procedures;

FIG. 2 is a block diagram of a computing device that may be used in the exemplary system of FIG. 1; and FIG. 3 is an exemplary method, which may be used in connection with the system of FIG. 1, to facilitate transactions to payment accounts by opting certain ones of the transactions out of certain authentication methods or procedures when such transactions are consistent with profiles associated with the payment accounts to which the transactions are directed.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transactions to payment accounts often include authentication of consumers performing the transactions. Typically, such authentication is performed regardless of whether the transactions are performed at physical merchant locations (e.g., at brick-and-mortar locations, etc.) or at virtual merchants locations (e.g., at websites, via network-based applications, etc.). However, different authentication procedures may present problems for issuers such as, for example, declining transactions based on authentication failures even when the correct consumers are attempting the transactions. Uniquely, the systems and methods herein permit use of network-based applications (e.g., virtual wallets, etc.) or other devices, used in connection with payment account transactions, to generate profiles for consumers and/or payment accounts associated therewith, and then to opt transactions consistent with the profiles out of one or more traditional authentication procedures (e.g., provide silent authentication of the transactions, etc.). For example, a consumer profile may be generated based on a prior purchase history for a consumer. Then, when a transaction is initiated by the consumer, the transaction is compared to the consumer profile for consistency (e.g., taking into account transaction size, time of day, merchant involved in the transaction, etc.). If consistent, the transaction is opted out of one or more authentication procedures typically applied to the transaction, such as, for example, a consumer signature, personal identification number (PIN) entry, biometric entry, password entry, challenge questions, CAPTCHA (Completely Automated Public Turing test to tell Computers and Humans Apart), etc. (e.g., the transaction is silently authenticated based on the consumer profile, and without further authentication input from the consumer, etc.). If inconsistent, however, the transaction is then subjected to the typical authentication procedure(s) associated with the payment account used in the transaction, the merchant involved in the transaction, and/or the issuer of the payment account. In this manner, transactions by the consumer consistent with the consumer's profile may be facilitated more efficiently, by reducing and/or eliminating risks that the authentication procedure(s) typically applied to the transactions will improperly decline the transactions.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, depending on, for example, how transactions are processed, which authentication procedures are employed, etc.

As shown in FIG. 1, the illustrated system 100 generally includes a merchant 102, an acquirer 104, a payment network 106, and an issuer 108, each coupled to (and in communication with) one or more networks, including, for example, network 110. The network 110 may include, without limitation, a wired and/or wireless network, a local area network (LAN), a wide area network (WAN) (e.g., the Internet, etc.), a mobile network, and/or any other suitable public and/or private network capable of supporting communication among two or more of the illustrated parts of the system 100, or any combination thereof. In addition, the network 110 may include multiple networks, where different ones of the multiple networks are accessible to different ones of the illustrated parts in FIG. 1. For example, in the illustrated system 100, the network 110 may include a private network accessible to the acquirer 104, the payment network 106, and the issuer 108 for processing purchase transactions, and, separately, a public network (such as the Internet) through which consumer 112 (e.g., via communication device 114, etc.) may communicate with the merchant 102 to purchase products.

In general in the system 100, the merchant 102 provides products (e.g., goods and services, etc.), at physical store-front locations (e.g., at brick-and-mortar stores, etc.) and/or through virtual store-front locations (e.g., through network-based applications/interfaces, etc.). The products are available for purchase by the consumer 112 through desired transactions. The present disclosure is described with reference to transactions in which the consumer 112 purchases products from the merchant 102 using a payment account issued to the consumer 112 by the issuer 108. However, it should be appreciated that the present disclosure encompasses a variety of other transaction scenarios, involving payments via channels other than payment accounts (with such authentication still applicable).

In addition, the consumer 112 is associated with the communication device 114, which is configured to facilitate card-present transactions (e.g., at a physical location of merchant 102, etc.) and/or card-not-present transactions (e.g., via a virtual store-front location of the merchant 102, etc.) to purchase one or more products from the merchant 102 using the payment account. In particular, as illustrated in FIG. 1, the communication device 114 includes a network-based payment application 116 (e.g., a virtual wallet application, an e-wallet application, etc.), and the consumer's payment account is appended to the network-based payment application 116. As such, in connection with a transaction at the merchant 102, the payment application 116 can be used to provide credentials for the consumer's payment account (or potentially another account in the payment application 116) to the merchant 102, etc. The consumer 112 is also associated with computing device 118, through which the consumer 112 is able to access a virtual store-front location for the merchant 102 (e.g., through one or more network-based applications/interfaces, etc.) to purchaser products from the merchant 102 using the payment account (or potentially another account in the consumer's payment application 116 or even an account not in the consumer's payment application).

In the illustrated embodiment (and as described above), the consumer's payment account is associated with at least one authentication service, as implemented by the payment network 106 and/or the issuer 108, for example, whereby the consumer 112 is required to authenticate himself/herself when initiating a transaction with the payment account. The at least one authentication service may include or involve, without limitation, a 3-Domain Secure (3-DS) protocol, such as, for example, SecureCode® by MasterCard, Verified® by VISA, Safekey® by American Express, etc., or any other suitable protocol or service. Various different authentication procedures may then be implemented via the authentication service such as, for example, a consumer signature, entry of a PIN, entry of a consumer biometric, entry of a password, response to one or more challenge questions, response to a CAPTCHA inquiry, etc.), in connection with authorizing the transaction.

With continued reference to FIG. 1, the system 100 also includes various additional parts, which participate in authentication of the consumer 112 in connection with transactions by the consumer 112 at the merchant 102 (and involving the consumer's payment account). In this exemplary embodiment, the additional parts relate to the 3-DS protocol associated with the consumer's payment account when used for certain transactions (e.g., for card-not-present transactions, etc.). However, the present disclosure is not limited to the 3-DS protocol. In other embodiments, for example, different authentication services/protocols may be implemented (other than a 3-DS protocol), with different authentication procedures then used therewith. As such, in these other embodiments, the system 100 may include different parts to support the different authentication services/protocols and/or the various different potential authentication procedures used, as necessary.

In particular, in connection with the 3-DS authentication services used in this exemplary embodiment, the system 100 includes a merchant plug-in (MPI) 120 (broadly, a service provider) and an access control server (ACS) 122 (broadly, a service provider). As shown, each is coupled to the payment network 106, via one or more network connections, for example, via network 110, etc., as indicated by the arrowed lines. The MPI 120 and the ACS 122 may comprise any suitable computing devices and/or any protocols (e.g., including, but not limited to, the 3-DS protocols, etc.), for example, that take part in authenticating the consumer 112 prior to permitting/authorizing purchase transactions by the consumer 112 using the consumer's payment account, for example, at the merchant 102 (and that take part in authenticating other consumers at the merchant 102 and/or at other merchants in the system 100). The MPI 120 is a service provider separate from the merchant 102 (in this embodiment), yet coupled thereto via one or more network connections (such as network 110) to provide authentication messaging to/from the merchant 102, as described herein. In addition, the MPI 120 may provide services to other merchants (not shown) in the system 100. The ACS 122 is a service provider coupled to the issuer 108 via one or more network connections (such as network 110) and, potentially, to other issuers (not shown) in the system 100, whereby the ACS 122 provides authentication messaging on behalf of the issuer 108, as described herein.

While one MPI 120 and one ACS 122 are illustrated in the system 100 in FIG. 1, for ease of illustration, it should be appreciated that any number of MPIs and ACSs may be included in the system 100 or in other system embodiments. In addition, while the MPI 110 is illustrated as separate from the merchant 102 (and the acquirer 104), it may be incorporated with the merchant 102 and/or the acquirer 104 in other embodiments. Similarly, while the ACS 122 is illustrated as separate from the issuer 108, it may be incorporated therewith in other embodiments. Further, in at least one embodiment, the MPI 110 and/or the ACS 122, or certain aspects thereof, may be integrated with the payment network 106, or parts thereof.

It should also be appreciated that additional, different or other parts may be included in the system 100 depending on, for example, the particular type of authentication and/or security service(s)/protocol(s) being provided in connection with the various transactions. For example, the system 100 may include a biometric authentication service (instead of the 3-DS service and its associated parts), where a biometric service provider (alone or as part of either the payment network 106 or the issuer 108) may be coupled to (and in communication with) the network 110 to facilitate biometric verification/authentication of the consumer 112 (and/or of other consumers in the system 100). In another example, a service provider (again, alone or as part of either the payment network 106 or the issuer 108) may be coupled to (and in communication with) the network 110, for providing queries to the consumer 112 (and/or to other consumers in the system 100) when a transaction is attempted, as an authentication service (again, instead of the 3-DS service and its associated parts). The queries may be specific to the consumer 112 (e.g., in the form of security questions, etc.) or they may be non-specific (e.g., CAPTCHA questions, etc.). As such, it should be appreciated that the various different authentication procedures described herein may be implemented in the system 100 as part of the 3-DS protocol, or separate therefrom. The present disclosure, then, generally provides for (among other things) opting consumers/transactions out of the various authentication producers (e.g., implement silent authentication, etc.), when appropriate, regardless of the service(s)/protocol(s) in place implemented the authentication procedures.

With that said, an example transaction by the consumer 112 at the merchant 102 is described next, in which the consumer 112 desires to purchase a product from a virtual store-front location associated with the merchant 102, as accessed via the communication device 114, and fund the transaction using the payment account stored in the network-based payment application 116. It should again be appreciated, however, that the present disclosure encompasses a variety of other transaction scenarios, for example, involving payment accounts not associated with the network-based payment application 116, etc.

In this example, when the consumer 112 identifies a product to purchase at the merchant 102, the consumer 112 presents credentials to the merchant 102 for the payment account for use in the purchase (e.g., via the payment application 116, etc.). In turn, the merchant 102 identifies the payment account. Because the transaction is initiated at the virtual store-front of the merchant 102 and because the merchant 102 is participating in 3-DS authentication, in this example, the transaction is directed by the merchant 102 to the MPI 120.

Upon receipt (or notification) of the transaction, the MPI 120 is configured to transmit an authentication request message (as part of a request, for example) to the payment network 106 for the transaction. In turn, the payment network 106 is configured to determine if the issuer 108 associated with the consumer's payment account is a participant in the 3-DS authentication service as described above (e.g., determine if the consumer 112 is enrolled for such authentication and if the issuer 108 can perform the authentication, etc.). In this example, the issuer 108 is a participant in the authentication service. As such, the payment network 106 is configured to search for the ACS 122 (e.g., an ACS address, etc.) associated with the issuer 108 and to transmit the authentication message to the ACS 122. The authentication message transmitted by the payment network 106 to the ACS 122 may include, for example, the exact message received from the MPI 120, a modified version of the message, or a new message incorporating the original authentication message from the MPI 120 (in whole or in part) and/or details associated therewith.

The ACS 122 is configured to then verify whether or not the particular payment account associated with the consumer 112, as defined in the authentication message, is enrolled in the authentication service. If it is (as is the case in this example), the ACS 122 is configured to provide a response message including a verified indicator (or metric) back through the payment network 106 to the MPI 120. However, if the payment account is not enrolled, the ACS 122 is configured to provide a response message including a non-verified indicator back through the payment network 106 to the MPI 120. In either case, the response message transmitted by the payment network 106 to the MPI 120 may be the exact message received from the ACS 122, a modified version of the message, or a new message incorporating the original response message from the ACS 122 (in whole or in part) and/or details associated therewith.

Upon receipt of the response message for the consumer's transaction from the ACS 122, with the verified indicator included therein in this example, the MPI 120 is configured to send a request for consumer authentication to the virtual store-front of the merchant 102. The virtual store-front is configured to then communicate with the ACS 122 to perform authentication of the consumer 112. In particular, an interface is displayed from the ACS 122, as part of, or in a separate interface to, the virtual store-front, at the communication device 114, which prompts the consumer 112 to enter a code or other authentication identifier (e.g., a biometric, etc.) particular to the consumer 112, as part of a traditional authentication procedure. In response to the code (or other identifier), the ACS 122 is configured to confirm the code and to generate an accountholder authentication value (AAV) (broadly, an authentication indicator), which is transmitted to the MPI 120. The interface from the ACS 122 is then closed. Upon receipt, the MPI 120 is configured to provide the AAV to the merchant 102, and in particular, to the merchant's virtual store-front (for use in authorizing the transaction). If the code (or other identifier) is not confirmed by the consumer 112, however, the consumer 112 may be given an additional opportunity (or multiple additional opportunities) to submit the correct code (or other identifier). When the additional opportunity expires, and at discretion of the ACS 122, the issuer 108 and/or the merchant 102 is then prompted to decide whether to abort the transaction or continue and submit it for authorization anyway (with certain fraud responsibility if the transaction is later determined to be fraudulent).

While in the above example, authentication of the consumer 112 is described with reference to, and is directed to and from, the MPI 118 and/or the ACS 120 in connection with the 3-DS protocol, it should again be appreciated that the present disclosure is not so limited to 3-DS authentication, and that in other embodiments other authentication services/protocols involving various authentication procedures may be implemented, with corresponding authentication messages being passed differently among parts of the system 100, yet still being subjected to the systems and methods herein. But regardless of the service/protocol, authentication is preferably performed in the system 100 in addition to a conventional payment account authorization process between the consumer 112 and the merchant 102.

Then in this example, based on the authentication of the consumer 112 as described above, the merchant 102 is configured to generate an authorization request/message in a conventional manner, to determine if the consumer's payment account is in good standing and if there is/are sufficient credit/funds to authorize the transaction (e.g., consistent with ISO 8583, etc.). The authorization request includes, among other things, a payment account number, an amount of the transaction, and the AAV received from the 3-DS authentication. In other embodiments, when services/protocols other than 3-DS authentication are implemented, authentication indicators other than the AAV may be included in the authorization request (e.g., depending on the particular service/protocol implemented, etc.).

Once generated, the authorization request is sent from the merchant 102 to the acquirer 104. In turn, the acquirer 104 is configured to communicate the authorization request to the issuer 108, via the payment network 106. The issuer 108 is configured to then validate the AAV, in this exemplary embodiment, and other aspects of the authorization request (e.g., determine if the consumer's payment account is in good standing and if there is/are sufficient credit/funds to authorize the transaction, etc.), to determine whether to authorize the transaction. The issuer 108 is then configured to send an authorization response back through the payment network 106 to the merchant 102 (via the acquirer 104), either approving or declining the transaction. If the transaction is approved (or authorized), the credit line or funds associated with the payment account of the consumer 112, depending on the type of account, is decreased by the amount of the purchase, and the charge is posted to the consumer's payment account. The transaction is later cleared and settled by and between the merchant 102 and the acquirer 104 and by and between the acquirer 104 and the issuer 108 (e.g., in accordance with appropriate settlement arrangements, etc.). Alternatively, if the transaction is declined, the merchant 102 may terminate the transaction or request alternative forms of payment.

Transaction data is generated, collected and stored as part of the above interactions among the merchant 102, the acquirer 104, the payment network 106, the issuer 108, the consumer 112, the MPI 120, and/or the ACS 122 (and included in the various transaction messages). The transaction data, in this exemplary embodiment, is stored at least by the payment network 106 (e.g., in a data structure associated with the payment network 106, etc.). Additionally, or alternatively, the merchant 102, the acquirer 104, the issuer 108, the MPI 120, the ACS 122, etc. may store the transaction data, or part thereof, in a data structure, or transaction data may be transmitted between parts of system 100 as used or needed. With that said, transaction data may include, for example, primary account numbers (PANs) for consumers involved in the transactions, amounts of the transactions, AAVs or other authentication indicators, merchant IDs, merchant names, merchant category codes (MCCs), dates/times of the transactions, transaction amounts, products purchased and related descriptions or identifiers, account balances, etc. It should be appreciated that more or less information related to transactions, as part of either authentication, authorization, or clearing and/or settlement, may be included in transaction records and stored within the system 100, at one or more of the different parts, etc.

In various exemplary embodiments, consumers (e.g., consumer 112, etc.) involved in the different transactions herein agree to legal terms associated with their payment accounts, for example, during enrollment in their accounts, etc. In so doing, the consumers may voluntarily agree, for example, to allow merchants, issuers, payment networks, acquirers, MPIs, ACSs, etc., to use data collected during enrollment and/or collected in connection with processing the transactions, subsequently, for one or more of the different operations described herein.

FIG. 2 illustrates an exemplary computing device 200 that can be used in the system 100. The computing device 200 may include, for example, one or more servers, workstations, personal computers, laptops, tablets, smartphones, POS terminals, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the system 100, each of the merchant 102, the acquirer 104, the payment network 106, the issuer 108, the MPI 120, and the ACS 122 are illustrated as including, or being implemented in, computing device 200. Also in the system 100, the communication device 114 and the computing device 118 associated with the consumer 112 are both computing devices generally consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 generally includes a processor 202 and a memory 204 coupled to (and in communication with) the processor 202. The processor 202 may include one or more processing units (e.g., in a multi-core configuration, etc.) including, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are exemplary only, and are not intended to limit in any way the definition and/or meaning of processor.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204, and/or data structures included therein, may be configured to store, without limitation, transaction data, authentication codes (or other identifiers), authentication outcomes, interfaces, profiles for consumers and/or payment accounts, and/or other types of data and/or information suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. It should be appreciated that the memory 204 may include a variety of different memories, each implemented in one or more of the functions or processes described herein.

The computing device 200 also includes a presentation unit 206 (or output device or display device) that is coupled to (and is in communication with) the processor 202 (however, it should be appreciated that the computing device 200 could include output devices other than the presentation unit 206, etc.). The presentation unit 206 outputs information, either visually or audibly to a user of the computing device 200, for example, a consumer of the system 100 (e.g., the consumer 112, etc.); a user associated with the payment network 106, a user associated with the MPI 120, a user associated with the ACS 122, etc.; or another user associated with another part of the system 100; etc. It should be further appreciated that various interfaces (e.g., associated with authentication requests, etc.) may be displayed at computing device 200, and in particular at presentation unit 206, to display information, such as, for example, information relating to authentication of consumers, information relating to authorization of transactions, etc. The presentation unit 206 may include, without limitation, a liquid crystal display (LCD), a light-emitting diode (LED) display, an organic LED (OLED) display, an "electronic ink" display, etc. In some embodiments, presentation unit 206 includes multiple devices.

The computing device 200 further includes an input device 208 that receives inputs from the user of the computing device 200 (i.e., user inputs) or from another computing device. The inputs may include, for example, transaction data, authentication codes or responses, etc. The input device 208 is coupled to (and is in communication with) the processor 202 and may include, for example, a keyboard, a pointing device, a mouse, a stylus, a biometric reader, a touch sensitive panel (e.g., a touch pad or a touch screen, etc.), another computing device, and/or an audio input device. In various exemplary embodiments, a touch screen, such as that included in a tablet, a smartphone, or similar device, behaves as both a presentation unit 206 and an input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to (or with) one or more of the different networks in the system 100, including the network 110. Further, in some exemplary embodiments, the computing device 200 includes the processor 202 and one or more network interfaces incorporated into or with the processor 202.

Referring again to FIG. 1, the system 100 also includes an engine 124, which is specifically configured, by executable instructions, to perform one or more of the operations herein. As shown, the engine 124 is illustrated apart from the payment network 106, but, as indicated by the dotted lines, may be incorporated therein, in whole or in part, for use in operating as described herein. In other embodiments, however, it should be appreciated that the engine 124 may be incorporated with other parts of the system 100, for example, the acquirer 104, the issuer 108, etc. The engine 124 may include or be associated with a computing device generally consistent with computing device 200. The engine 124, as described herein, may further include multiple engines (i.e., different computing devices), for example, based on operation (e.g., a first engine configured to generate a profile, and a second engine configured to compare the profile to transaction details, etc.). Further, the engine 124 may be implemented and/or located, based on where, for example, an authentication message for a payment account transaction is received and/or evaluated, as described herein, etc. (such that the engine 124 readily has access to the authentication message to perform as described herein).

In this exemplary embodiment, the engine 124 is configured to generate a profile for consumer 112, based on transaction data (including a transaction history) for the consumer's payment account (and for other payment accounts in the consumer's payment application 116). The profile is then mapped against an identifier for the consumer's payment application 116 or other consumer identifier. In particular, the engine 124 is configured to access transaction data for the payment account of the consumer 112 (issued to the consumer 112 by issuer 108) and for other payment accounts in the payment application 116, for example, from the payment network 106 or another payment network, etc., for a defined interval (e.g., 1 week, 1 month, 3 months, 6 months, 1 year, multiple years, etc.). Once accessed, the engine 124 is configured to then generate the profile for the consumer 112 (and/or for the consumer's payment account(s)), and associate the profile with the consumer's payment application 116 (such that the profile is generally payment application based). The profile may include various statistics for the consumer 112 including, for example: a listing of historical transactions made by the consumer (or others) to the payment account(s) in the payment application 116 and associated transaction data such as transaction PANs, transaction merchants (e.g., merchant 102 and data related thereto such as name, address, time in business, etc.; etc.), merchant categories, product categories, price points, transaction time periods and associated transaction frequencies, etc.; name, address, contact information, and various demographic information for the consumer 112, etc.; the identifier for the payment application 116 at which the payment account (and other potential payment accounts for the consumer 112) is/are stored (e.g., an electronic wallet identifier, etc.), etc.

In generating the profile for the consumer 112, in some implementations of the system 100, the engine 124 is configured to generate, and include in the profile, various indicators of transaction patterns for the consumer 112 based on the consumer's historical transactions to payment accounts in the payment application 116 (and various different parameters thereof). For example, one transaction pattern may include that the consumer 112 purchases fuel at a particular merchant each Monday in the morning using one payment account in the payment application 116. Another transaction pattern may include that the consumer 112 purchases coffee from a particular merchant each morning between 7:00 am and 8:00 am using another payment account in the payment application 116. A further transaction pattern may include that the consumer 112 purchases lunch each day, Monday through Friday, with a spend range of between $7.00 and $12.00, at various different merchants and using various different payment accounts in the payment application 116. Then, the engine 124 is configured to compare subsequent transactions (specifically, transaction details thereof) to the various patterns in the profile, to identify if the subsequent transactions satisfy one or more of the patterns (suggesting that the transactions were performed by the consumer 112), or are outliers. In particular, the engine 124 may be configured, for example, to designate (e.g., score, etc.) subsequent transactions that are consistent with one or more of the patterns as high confidence transactions (and low risk transactions), and trigger silent authentication of the consumer 112 for the transactions (i.e., thereby opting the transactions out of traditional authentication procedures typically applied). Thus, as can be appreciated, correct pattern validation by the engine 124, then, can trigger seamless authentication and high confidence scoring of the transactions.

As an example, the consumer 112 may use the payment account, via the payment application 116, to purchase groceries on a weekly basis. In connection therewith, a listing of historical transactions for the last three weeks may include three total transactions for groceries: $160.50 in week 1; $170.30 in week 2; and $158.65 in week 3. In addition, the transaction data may indicate that each transaction occurred on a Sunday, at merchant 102, between 10:00 am and 11:34 am. Based on this historical transaction data, the engine 124 is configured to generate, and include in the profile for the consumer 112, a pattern indicator that the consumer 112 tends to purchase groceries mid-morning on Sunday at merchant 102, with an average total spend of $163.15 and spend range of $158.65 to $170.30. In this example, upon identifying a subsequent transaction by the consumer 112 for groceries at merchant 102, on a Sunday at 11:00 am, for $159.80, the engine 124 determines that the transaction is generally consistent with the above pattern, and is configured to designate the transaction as a high confidence (low risk) transaction, for example, that triggers silent authentication of the consumer 112 as described herein.

It should be appreciated that the engine 124 may be configured to generate the profile for the consumer 112 based on a single payment account, or, as described above, based on each payment account appended to the payment application 116 (and potentially payment accounts appended to other payment applications associated with the consumer 112), regardless of issuer and regardless of payment network through which transactions made to the payment account are processed.

Specifically, for example, the payment account appended to the payment application 116 and described in the above example transaction is issued to the consumer 112 by issuer 108 and is associated with payment network 106 (whereby transactions to the payment account are processed by the payment network 106 and are directed to the issuer 108). Another payment account associated with the consumer 112 and appended to the payment application 116, however, may be issued to the consumer 112 by a different issuer (not shown) and may further be associated with a different payment network (not shown). Thus, as can be appreciated, the consumer 112 may be associated with multiple different payment accounts appended to the consumer's payment application 116 (or to another payment application), where the different payment accounts are issued by multiple different issuers and are further associated with multiple different payment networks. In connection therewith, the payment application 116 (and any other payment application associated with the consumer 112) is configured to facilitate a complete profile for the consumer 112, in that it may be configured to retrieve transaction data associated with each of the multiple different payment accounts associated with the consumer 112 (and appended to the respective payment application), to provide the transaction data to the engine 124, and/or may be configured to permit the engine 124 to retrieve and/or access transaction data from/for each of the payment accounts appended thereto (for use in generating the profile for the consumer 112, and the various content included therein).

Then, once the profile for the consumer 112 is generated, the engine 124 is configured to store the profile in a data structure (e.g., in memory 206, etc.) for subsequent use as described below. The data structure may further include profiles for multiple other consumers initiating and/or making transactions in the system 100 (or in other systems).

In operation in the above example transaction between the consumer 112 and the merchant 102, the engine 124 is configured to interrupt the flow of the authentication message from the MPI 120, and determine if a traditional authentication procedure, via the 3-DS authentication service, is needed and/or desired (or if the transaction can be opted out of such traditional authentication procedure). Specifically, the engine 124 is configured to receive the authentication message from the MPI 120 and to compare details of the transaction (e.g., time of day, day of the month/week, merchant, amount, etc.) with the generated profile for the consumer 112. The engine 124 is further configured to either permit the authentication message to proceed to the ACS 122 when the transaction is inconsistent with the profile, or opt the transaction out of the traditional authentication procedure associated with the 3-DS authentication when the transaction is consistent with the profile (e.g., append a confirmation indication to the authentication message indicating that the transaction can be opted out of the traditional authentication procedure, etc.). This is described in more detail below.

The engine 122 may further be associated with a data structure (e.g., in memory 204), which includes one or more rules associated with the consumer's payment account and/ or the issuer 108 of the payment account. The rules may relate, for example, to conditions, etc., for which the payment network 106, the issuer 108, and/or the consumer 112 desire to have traditional authentication procedures, associated with the 3-DS authentication service in the above example, be unaffected by the comparison of the transaction to the profile. Such conditions may include threshold amounts for the transactions, merchants involved in the transactions, products involved in the transactions, types of the transactions (e.g., card-not-present versus card-present, etc.), etc. It should be appreciated that any number of rules may be layered upon the profile to permit the engine 122 to be configured to determine if traditional authentication procedures are needed and/or desired.

As an example, the engine 124 may be configured, by one or more of the rules, to pass the authentication message (and associated transaction) to the ACS 122, regardless of the comparison of the underlying transaction with the profile, when the transaction exceeds a defined threshold amount (e.g., $100, $500, etc.). Or, the engine 124 may be configured, by one or more of the rules, to opt the authentication message (and associated transaction) out of traditional authentication procedures, regardless of the comparison of the transaction with the profile, when the transaction falls below a threshold defined amount (e.g., $5, $20, etc.). As another example, the engine 124 may be configured, by one or more of the rules, to pass the authentication message (and associated transaction) to the ACS 122, or opt it out of traditional authentication procedures, based on the particular merchant involved in the transaction, the merchant 102, etc.). As still another example, the engine 124 may be configured, by one or more of the rules, to pass the authentication message (and associated transaction) to the ACS 122 when the transaction involves a card-not-present transaction, or opt it out of traditional authentication procedures when the transaction involves a card-present transaction.

FIG. 3 illustrates an exemplary method 300 for facilitating transactions to payment accounts, by opting certain ones of the transactions out of traditional authentication services (e.g., effect silent authentication of the transactions, etc.) when the transactions are consistent with consumer profiles associated with payment accounts to which the transactions are directed. The exemplary method 300 is described with reference to the system 100, as implemented, at least in part, in the engine 124, and with further reference to the computing device 200. However, the methods herein should not be understood to be limited to the exemplary system 100 or the exemplary computing device 200, and likewise, the systems and the computing devices herein should not be understood to be limited to the exemplary method 300.

Initially in the method 300, the engine 124 generates the profile for the consumer 112, at 302. In particular, the engine 124 accesses transaction data for historical transactions by the consumer 112 through the payment application 116, for multiple different payment accounts included in the payment application 116. In so doing, the engine 124 is able to utilize transaction data for multiple ones of the consumer's payment accounts, regardless of merchants involved in the historical transactions (be them physical or virtual), regardless of issuers associated with the payment accounts, regardless of payment networks associated with processing the historical transactions, and/or regardless of other differences in scheme agnostics between the payment accounts, etc. The accessed transaction data may include all available transaction data, or it may include transaction data for a defined interval (e.g., 1 week, 1 month, 3 months, 6 months, 1 year, multiple years, etc.).

Once the profile is generated, the engine 124 then maps it against the identifier for the consumer's payment application 116, at 304, to thereby generally associate the profile with the consumer 112. In connection therewith, the profile may also be associated with different payment accounts of the consumer 112 (e.g., with different PANs for the consumer's payment accounts, etc.), with a name of the consumer, etc., to allow for subsequent identification of the profile in response to a transaction (for use as described herein).

When a transaction is initiated by the consumer 112 at the merchant 102 using the consumer's payment account, for example, the MPI 120 (in association with the merchant 102) is configured to transmit an authentication request message for the transaction to the payment network 106. In connection therewith, the authentication request message is received, at 306, by the engine 124 (e.g., in conjunction with receipt of the authentication request message at the payment network 106, prior to receipt of the authentication request message at the payment network 106, etc.).

Upon receipt of the authentication request message, the engine 124 may initially determine if the issuer 108 associated with the consumer's payment account, as identified in the authentication request message, is a participant in the 3-DS authentication service as described herein. If it is a participant, the engine 124 then accesses, at 308, a profile for the consumer 112 (and/or the consumer's payment application 116) in memory 204, for example, based on the PAN for the consumer's payment account included in the authentication request message, or based on other data included in the authentication request message, etc. The profile, as described above in connection with the system 100, may include any different representation of historical purchases by the consumer 112, initiated to the payment account (and, potentially, to multiple other payment accounts associated with the consumer 112 and/or the consumer's payment application 116), and/or initiated via the payment application 116 (and regardless of whether they are at physical merchants or virtual merchants).

At 310, the engine 124 compares one or more details of the transaction to the profile, and then determines, at 312, if the details are consistent with the profile. As described above, the profile may include various statistics for the consumer 112 including, for example: a listing of historical transactions made by the consumer (or others) to the payment account(s) in the payment application 116 and associated transaction data such as transaction PANs, transaction merchants (e.g., merchant 102, etc.), merchant categories, product categories, price points, transaction time periods and associated transaction frequencies (e.g., for periodic transactions, etc.), etc.; name, address, contact information, and various demographic information for the consumer 112, etc.; the identifier for the payment application 116 at which the payment account (and other potential payment accounts for the consumer 112) is/are stored (e.g., an electronic wallet identifier, etc.), etc. In connection therewith, the engine 124 may compare details such as an amount of the instant transaction to an average amount, or range of amounts, of transactions for the consumer 112 included in the profile, a location of the transaction to a home location in the profile, the name/category of the merchant 102 to names/categories of other merchants in the profile at which the consumer 112 performed transactions, the product involved in the transaction to other products included in the profile, etc.

As an example (and in addition to the above examples), the profile may include an indicator that the consumer 112 purchases groceries at a particular merchant (in a particular merchant category) every two weeks, over the weekend, with a price range of $100.00 to $150.00. Then, if the engine 124 identifies a subsequent transaction involving one of the consumer's payment accounts (regardless of whether it is in the consumer's payment application 116) at another merchant in the same particular merchant category and/or involving groceries, the engine 124 may determine the transaction to be similar to the profile and designate the transaction as a high confidence (low risk) transaction. Because the transaction is a low risk transaction, the engine 124 identifies the transaction for silent authentication (without further requiring traditional authentication procedures or other authentication input from the consumer 112), and causes the transaction to proceed (e.g., to proceed to authorization as described above, etc.).

Next in the method 300, if the transaction is inconsistent with the consumer's profile, the engine 124 directs the authentication request message to the ACS 122 and/or to the issuer 108 (or, in embodiments where 3-DS authentication is not used, to another authentication service provider/vender associated with the issuer 108 and such authentication), at 314. The ACS 122, in this embodiment, in turn continues authentication of the consumer in accordance with the 3-DS protocol, as described above in the system 100, and requires authentication of the consumer 112 via one or more traditional authentication procedures, at 316.

Alternatively, if the transaction is consistent with the consumer's profile (at 314), the engine 124 opts the transaction out of traditional authentication procedures, at 318, and generally silently authenticates the consumer 112. In so doing, the consumer 112 is not required/prompted to provide any further authentication inputs to proceed with the transaction (instead, the consistency between the transaction and the consumer's profile operates as the silent authentication for the consumer/transaction, used in place of the traditional authentication procedures).

In particular in the method 300, as part of opting the transaction out of the traditional authentication procedures (at 318), the engine 124 is configured to generate an authentication confirmation, at 320, confirming that the transaction is consistent with the consumer's profile and that the consumer 112 is thereby authenticated (i.e., silently authenticated, as the consumer 112 need not further provide further input regarding the authentication). Such confirmation may include a "1" indicating that the consumer 112 is authenticated or a "0" indicating that the consumer 112 is not authenticated, or any other desired confirmation. Then, at 322, the engine 124 appends the authentication confirmation to the authentication request message, and, at 324, transmits the message to the ACS 122 and/or the issuer 108 (or, in embodiments where 3-DS authentication is not used, to another authentication service provider/vender associated with the issuer 108 and such authentication). In turn, the ACS 122 generates an AAV, as described above, and transmits the AAV back to the MPI 120 and/or merchant 102 as part of the authentication reply message. Alternatively, as indicated by the dotted lines in FIG. 3, the engine 124 may append the authentication confirmation directly to the reply message, at 326, for example, and transmit the message back to the MPI 120 and/or the merchant 102 (potentially, without involvement from the ACS 122 and/or the issuer 108), at 328.

In view of the above, the systems and methods herein may allow authentication procedures to be avoided for transactions that are consistent with profiles of consumers involved in the transactions. In this manner, the potential for improper declines of transactions, based on the authentication procedures, can be reduced, if not eliminated (at least for transactions that are consistent with the profiles).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving an authentication request message for a transaction to a payment account associated with a consumer, the payment account associated with at least one authentication procedure requiring input from the consumer to authenticate the consumer in connection with the transaction, the authentication request message including at least one detail related to the transaction; (b) accessing a profile associated with the consumer, the profile based, at least in part, on a prior transaction history of the payment account; (c) opting the transaction out of the at least one authentication procedure when the at least one detail related to the transaction is consistent with the profile; (d) directing the authentication request message to one or more of the issuer and the authentication service provider when the at least one detail related to the transaction is inconsistent with the profile, thereby requiring input from the consumer to authenticate the consumer in connection with the transaction via the at least one authentication procedure; and (e) generating the profile based at least in part on historical transaction data associated with the network-based payment application.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

As used herein, a token (e.g., a payment token, etc.) generally is an electronic data set that includes credentials that may be used in a purchase transaction in place of traditional payment credentials. Typically, the credentials for the token are uniquely associated to a computing device (e.g., a portable communication device, etc.), for example, to which the token is provisioned. Because the token is directly associated to the computing device, theft of the token may be inconsequential to the user, since the token is unusable if not used in conjunction with the proper computing device. Thus, the use of the token can enable electronic payment transactions involving the computing device with greater security without a sacrifice to efficiency or convenience. The systems and methods herein thus may also include, as appropriate, generating and/or assigning the tokens to consumers and provisioning the tokens to computing devices associated with the consumers.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating transactions associated with a payment account, the method comprising:

receiving, by a computing device, an authentication request message for a transaction to a payment account associated with a consumer, the payment account associated with at least one authentication procedure, the authentication procedure associated with an access control server and requiring input from the consumer to authenticate the consumer in connection with the transaction, the authentication request message including at least one detail related to the transaction and an identifier associated with the consumer;

based on the identifier included in the authentication request message, accessing, by the computing device, a profile associated with the consumer from a data structure, the profile including a transaction pattern for the consumer based, at least in part, on a prior transaction history of the payment account;

determining, by the computing device, whether the at least one detail related to the transaction is consistent with the profile; and when the at least one detail related to the transaction is consistent with the profile, opting, by the computing device, the transaction out of the at least one authentication procedure, wherein opting the transaction out of the at least one authentication procedure includes:

appending an authentication confirmation to an authentication reply message for the transaction; and directing the authentication reply message, with the appended authentication confirmation, to a merchant involved in the transaction, instead of directing the authentication reply message to the access control server.

2. The method of claim 1, wherein opting the transaction out of the at least one authentication procedure includes silently authenticating the consumer based on the at least one detail related to the transaction being consistent with the profile, without an authentication input from the consumer.

3. The method of claim 2, further comprising, when the at least one detail related to the transaction is inconsistent with the profile, directing the authentication request message to the authentication service provider without an authentication confirmation, thereby requiring input from the consumer to authenticate the consumer in connection with the transaction via the at least one authentication procedure.

4. The method of claim 1, wherein the payment account is associated with a network-based payment application; and further comprising generating, by the computing device, the profile based at least in part on historical transaction data associated with the network-based payment application.

5. The method of claim 4, wherein the at least one authentication procedure is selected from the group consisting of providing a consumer signature, providing of personal identification number (PIN), providing a biometric, providing a password, answering a challenge question, providing a response to a Completely Automated Public Turing test to tell Computers and Humans Apart (CAPTCHA) submission.

6. The method of claim 4, wherein the payment account is associated with a first issuer and a first payment network; and wherein the historical transaction data associated with the network-based payment application includes historical transaction data associated with the payment account and with at least one other payment account, the at least one other payment account associated with a second issuer different from the first issuer and with a second payment network different from the first payment network.

7. The method of claim 4, wherein generating the profile includes generating at least one transaction pattern based on the prior transaction history of the payment account, the at least one transaction pattern including an identification of at least one of a merchant, a merchant category, a product category, and a spend range.

8. The method of claim 7, wherein generating the profile further includes generating the profile for a defined interval, the defined interval being less than or equal to one year.

9. The method of claim 1, further comprising generating, by the computing device, the profile based, at least in part, on historical transaction data for one or more payment accounts associated with a network-based payment application; and wherein the payment account identified in the transaction request message is not associated with the network-based payment application.

10. The method of claim 1, wherein the transaction includes a card-not-present transaction involving a merchant.

11. The method of claim 1, wherein the at least one detail related to the transaction includes at least two of an amount of the transaction, a time of day of the transaction, and a merchant identifier for a merchant involved in the transaction.

12. A system for use in facilitating transactions associated with a payment account, the system comprising:

a memory including a data structure having a plurality of profiles for a plurality of different consumers, one of the plurality of profiles associated with an identifier for one of the consumers and including at least one transaction pattern based on prior transactions by the consumer to one or more payment accounts included in a payment application of the consumer; and a processor in communication with the memory and configured to:

receive an authentication request message for a transaction to a payment account associated with said consumer, the authentication request message including the identifier for the consumer;

based on the identifier included in the authentication request message, retrieve the profile for the consumer from the data structure;

compare at least one detail of the transaction to the transaction pattern in the retrieved profile;

when the at least one detail of the transaction does not match the at least one transaction pattern in the retrieved profile, cause the authentication request message to be transmitted to an authentication service provider associated with an issuer of the payment account, thereby requiring input from the consumer to authenticate the consumer in connection with the transaction via at least one authentication procedure implemented by the authentication service provider; and when the at least one detail of the transaction matches the at least one transaction pattern in the retrieved profile:

authenticate the consumer without further input from the consumer;

append an authentication confirmation to an authentication reply message; and cause the authentication reply message, with the authorization confirmation appended thereto, to be transmitted to a merchant involved in the transaction, thereby opting the transaction out of the at least one authentication procedure.

13. The system of claim 12, wherein the authentication request message identifies the payment account;

wherein the payment account identified in the authentication request message is a first of the one or more payment accounts included in the payment application and is associated with a first issuer and a first payment network; and wherein the one or more payment accounts included in the payment application further include a second payment account associated with a second issuer different from the first issuer and with a second payment network different from the first payment network.

14. The system of claim 13, wherein the processor is configured to generate the plurality of profiles and store the plurality of profiles in the data structure; and wherein the processor is further configured, in connection with generating the plurality of profiles, to retrieve historical transaction data, from the network-based payment application, for both of the first and second payment accounts included in the payment application.

15. The system of claim 14, wherein the at least one transaction pattern includes an identification of at least one of a merchant, a merchant category, a product category, and a spend range involved in the at least one transaction pattern; and wherein the at least one detail of the transaction matches the at least one transaction pattern in the profile when the at least one detail matches one or more of the merchant, the merchant category, the product category, and the spend range of the transaction pattern.

16. The system of claim 12, wherein the authentication request message identifies the payment account; and wherein the payment account identified in the authentication request message is not included in the payment application.

17. A non-transitory computer readable storage media including computer executable instructions for use in facilitating transactions associated with a payment account, which when executed by at least one processor, cause the at least one processor to:

generate a profile for a consumer based, at least in part, on a prior transaction history of a payment application including at least first and second payment accounts and on transaction data for the first and second payment accounts;

receive an authentication request message for a transaction to a payment account associated with the consumer;

in response to the authentication request message, compare at least one detail of the transaction to the prior transaction history include in the profile;

when the at least one detail of the transaction is inconsistent with the prior transaction history included in the profile, cause the authentication request message to be transmitted to an authentication service provider associated with an issuer of the payment account used in the transaction, thereby requiring input from the consumer to authenticate the transaction via at least one authentication procedure implemented by the authentication service provider; and when the at least one detail of the transaction is consistent with the prior transaction history included in the profile:

authenticate the consumer without further authentication input from the consumer;

append an authentication confirmation to an authentication reply message; and cause the authentication reply message, with the authentication confirmation appended thereto, to be transmitted to a merchant involved in the transaction, thereby opting the transaction out of the at least one authentication procedure associated with the authentication service provider.

18. The non-transitory computer readable storage media of claim 17, wherein the first payment account is associated with a first issuer and a first payment network and the second payment account is associated with a second issuer different from the first issuer and with a second payment network different from the first payment network.

* * * * *